United States Patent
Takao et al.

(10) Patent No.: US 6,838,800 B2
(45) Date of Patent: Jan. 4, 2005

(54) STATOR AND METHOD FOR PRODUCING THE STATOR

(75) Inventors: Mitsuyoshi Takao, Saitama (JP); Hirofumi Atarashi, Saitama (JP); Yasuhiro Endo, Saitama (JP); Akira Kato, Aichi (JP); Toshinori Tsukamoto, Saitama (JP); Keisuke Urushihara, Saitama (JP); Takeo Arai, Saitama (JP); Takeo Fukuda, Saitama (JP); Kazuaki Igarashi, Saitama (JP); Hiroyuki Kikuchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 62 days.

(21) Appl. No.: 10/262,075

(22) Filed: Oct. 2, 2002

(65) Prior Publication Data

US 2003/0067241 A1 Apr. 10, 2003

(30) Foreign Application Priority Data

Oct. 3, 2001 (JP) .................................... P2001-307841

(51) Int. Cl.$^7$ ................................................ H02K 3/00
(52) U.S. Cl. ...................... 310/198; 310/179; 310/216; 310/254; 310/214
(58) Field of Search .................. 310/179, 198, 310/208, 184, 195, 197, 201, 210, 216, 254, 196, 214, 217, 218; 29/596

(56) References Cited

U.S. PATENT DOCUMENTS

| 2,607,816 | A | * | 8/1952 | Ryder ........................... 310/42 |
| 3,827,141 | A | * | 8/1974 | Hallerback .................... 29/596 |
| 3,956,651 | A | * | 5/1976 | Brammerlo ................. 310/218 |
| 4,495,430 | A | * | 1/1985 | Herr et al. .................. 310/198 |

FOREIGN PATENT DOCUMENTS

JP          2000-156943          6/2000

* cited by examiner

Primary Examiner—Tran Nguyen
Assistant Examiner—Leda Pham
(74) Attorney, Agent, or Firm—Armstrong, Kratz, Quintos, Hanson & Brooks, LLP

(57) ABSTRACT

The stator includes core back iron cores disposed on outer circumferential sides between a plurality of teeth iron cores disposed at regular intervals of a predetermined distance in a predetermined circumferential direction. A stator winding is disposed on inner circumferential sides between the plurality of teeth iron cores. The stator winding is constituted by a plurality of wire bundles each of which is a bundle of a predetermined number of electric wires and which are connected in parallel with one another. The wire bundles are set so that the number of electric wires constituting a wire bundle located on the inner circumferential side between adjacent teeth iron cores is smaller than the number of electric wires constituting a wire bundle located on the outer circumferential side. Hence, the ratio (L/A) of the circumferential length L of each wire bundle to the sectional area A thereof is set at a value in a predetermined allowable range.

6 Claims, 5 Drawing Sheets

STATOR AND METHOD FOR PRODUCING THE STATOR

BACKGROUND OF THE INVENTION

1. Field of the Invention

The present invention relates to a stator for a generator-motor and a method for producing the stator.

2. Description of the Related Art

A stator as disclosed in JP-A-2000-156943 is known in the related art. In the stator, a stator iron core is separated into teeth iron core portions and core back iron core portions. After a stator winding is put in slot portions between the teeth iron core portions, the core back iron core portions are inserted in between the teeth iron core portions from the radially outer, side of the stator.

In such a stator, there is known a method in which a wire bundle constituted by a bundle of a plurality of electric wires is provided to make several revolutions so that the wire bundle weaves through the teeth iron core portions when the stator winding is put in the slot portions between the teeth iron core portions.

In the stator according to the related art, however, when, for example, a plurality of wire bundles are provided to come full circle to thereby form a stator winding, the wiring length of a wire bundle on an outer circumferential side between the teeth iron core portions becomes larger than the wiring length of a wire bundle on an inner circumferential side between the teeth iron core portions. Hence, the difference between the wiring lengths causes a difference between resistance values. For this reason, if a predetermined voltage is applied to the stator winding, a larger current flows in a wire bundle provided on an inner circumferential side and having a relatively smaller resistance value among the plurality of wire bundles connected in parallel with one another. As a result, the amount of heat generated in the wire bundle increases.

Here, a predetermined temperature up to which the stator winding exhibits heat resistance (hereinafter referred to as "heat-resistant temperature") is set in the stator winding. A predetermined allowable electric power supply range for an electric source or the like is determined so that the temperature of the stator winding can change in a predetermined temperature range corresponding to the heat-resistant temperature. There is, however, a possibility that it may be difficult to make various current conduction control by effectively utilizing the heat-resisting performance of the stator winding because the predetermined temperature range for the stator winding, that is, the allowable electric power supply range, is narrowed when the amount of heat generated in the wire bundle varies largely.

When, for example, the ratio of the resistance value change to the temperature change due to heat generation is 0.4%/° C. and the difference between resistance values of wire bundles is 14.3%, a temperature difference of 14.3/0.4≈36° C. is generated locally in the stator winding. Assuming now that the atmospheric temperature of the stator winding is 80° C. and the heat-resistant temperature is 180° C., then the predetermined temperature range for the stator winding, that is, the allowable electric power supply range is 180−80=100° C. There is, however, a possibility that the temperature range may be narrowed to 100−36=64° C. if a temperature difference of 36° C. is generated locally.

If such a temperature difference is generated when the temperature of the stator winding is a value near the predetermined heat-resistant temperature (for example, 180° C.), there is a possibility that the temperature of the stator winding may exceed the heat-resistant temperature because the temperature of the stator winding reaches 180+36=216° C. locally.

As measures against the problem, two methods are known in the case where a predetermined number of electric wires (for example, 80 electric wires) are connected in parallel with one another and provided to make several rounds (for example, three rounds) to thereby form a stator winding. The first method is a method in which the plurality of electric wires are connected in parallel with one another to thereby form one wire bundle and in which the wire bundle is provided to make several rounds. The second method is a method in which the plurality of electric wires are separated into a plurality of wire bundles (for example, four wire bundles) by a predetermined number of electric wires (for example, 20 electric wires) and in which the wire bundles are connected in parallel with one another after each of the wire bundles is provided to make several rounds (for example, three rounds).

In the first method, when one wire bundle is provided to make several rounds, the wire bundle is twisted at each predetermined position to transfer the inner circumferential side of the wire bundle to the outer circumferential side to thereby equalize the wiring lengths of electric wires constituting the wire bundle.

In this stator winding, there is, however, a possibility that the space factor may be lowered because a gap is produced between adjacent parts of the wire bundle, for example, in the position where the wire bundle is twisted.

In the second method, after each of the wire bundles is provided to make several rounds, a setting is made so that the length of a lead wire from each of the wire bundles is adjusted to a predetermined value and the wire bundles are connected in parallel with one another to thereby equalize the wiring lengths of the wire bundles inclusive of the lengths of the lead wires to one another. When, for example, the length of a lead wire from a wire bundle disposed on the outer circumferential side between the teeth iron core portions is set to be smaller than the length of a lead wire from a wire bundle disposed on the inner circumferential side between the teeth iron core portions, the difference between resistance values can be prevented from being caused by the difference between the wiring lengths of the wire bundles.

In such a stator winding, however, the length of the lead wire for the wire bundle disposed on the inner circumferential side needs to be made longer than other wires in order to increase the resistance value. As such, there is a possibility that the cost for production of the stator winding may increase. Moreover, because the lead wire becomes long, the coil end height becomes high. As such, there is a possibility that the size of the stator may increase.

The present invention is designed upon such circumstances and an object of the invention is to provide a stator in which the temperature difference in winding temperature between a plurality of electric wires constituting a stator winding can be suppressed while the size and production cost of the stator can be prevented from increasing, and to provide a method for producing the stator.

SUMMARY OF THE INVENTION

To solve the problems and achieve the foregoing object, in accordance with the invention, the present invention provides a stator having a plurality of teeth iron cores (for example, teeth iron cores 11 in an embodiment of the invention which will be described later) disposed at regular intervals of a predetermined distance in a predetermined circumferential direction, core back iron cores (for example, core back iron cores 12 in the embodiment which will be described later) each provided on an outer circumferential side between adjacent ones of the teeth iron cores, and a stator winding (for example, stator winding 25 in the embodiment which will be described later) constituted by a plurality of wire bundles arranged between the teeth iron cores so as to revolve along the circumferential direction and connected in parallel with one another. In this embodiment, each of the wire bundles is a bundle of electric wires, and the wire bundles are formed so that the number of electric wires forming a wire bundle on an inner circumferential side between the teeth iron cores is smaller than the number of electric wires forming a wire bundle on an outer circumferential side between the teeth iron cores.

According to the stator configured as described above, the sectional area of each wire bundle can be adjusted when the number of electric wires constituting the wire bundle is changed in accordance with the radial position between adjacent teeth iron cores. Accordingly, the difference between resistance values caused by the difference between the wiring lengths of wire bundles can be offset by the difference between resistance values caused by the difference between the sectional areas of the wire bundles, so that the resistance values of a plurality of wire bundles can be set to be equalized to one another regardless of the radial position between adjacent teeth iron cores.

That is, the resistance value in a wire bundle disposed on the outer circumferential side between adjacent teeth iron cores is larger than the resistance value in a wire bundle disposed on the inner circumferential side because the wiring length of the former wire bundle is larger than that of the latter wire bundle. For this reason, for example, the number of electric wires constituting the outer circumferential side wire bundle is set to be larger than the number of electric wires constituting the inner circumferential side wire bundle to increase the sectional area of the outer circumferential side wire bundle. This configuration thereby reduces the resistance value of the outer circumferential side wire bundle so that the resistance value of the outer circumferential side wire bundle can be set to be equal to that of the inner circumferential side wire bundle. Alternatively, the number of electric wires constituting the inner circumferential side wire bundle can be set to be smaller than the number of electric wires constituting the outer circumferential side wire bundle to decrease the sectional area of the inner circumferential side wire bundle to thereby increase the resistance value of the inner circumferential side wire bundle so that the resistance value of the outer circumferential side wire bundle can be set to be equal to that of the inner circumferential side wire bundle.

Hence, both a reduction in space factor and an increase in coil end height can be prevented regardless of the radial position between adjacent teeth iron cores when the resistance values of a plurality of wire bundles are set to be equal to one another.

According to the invention, there can be provided a method of producing a stator, comprising: arranging bundles of electric wires between a plurality of teeth iron cores disposed at regular intervals of a predetermined distance in a predetermined circumferential direction so that the wire bundles revolve along the circumferential direction; and connecting the wire bundles revolving along the circumferential direction in parallel with one other; wherein the wire bundles are formed so that the number of electric wires forming a wire bundle on an inner circumferential side between the teeth iron cores is smaller than the number of electric wires forming a wire bundle on an outer circumferential side between the teeth iron cores.

According to the method of producing a stator, when the wire bundles are provided to revolve, a larger number of electric wires are bundled to constitute a wire bundle located on the outer circumferential side between the teeth iron cores or a smaller number of electric wires are bundled to constitute a wire bundle located on the inner circumferential side between the teeth iron core. Hence, the difference between resistance values caused by the difference between the wiring lengths of the wire bundles can be offset by the difference between resistance values caused by the difference between the sectional areas of the wire bundles, so that the resistance values of a plurality of wire bundles can be set to be equal to one another regardless of the radial position between the teeth iron cores. Therefore, when the resistance values of a plurality of wire bundles are set to be equal to one another, an increase in production cost can be prevented while both reduction in space factor and an increase in coil end height can be prevented.

DETAILED DESCRIPTION OF THE PREFERRED EMBODIMENTS

Figure 1:
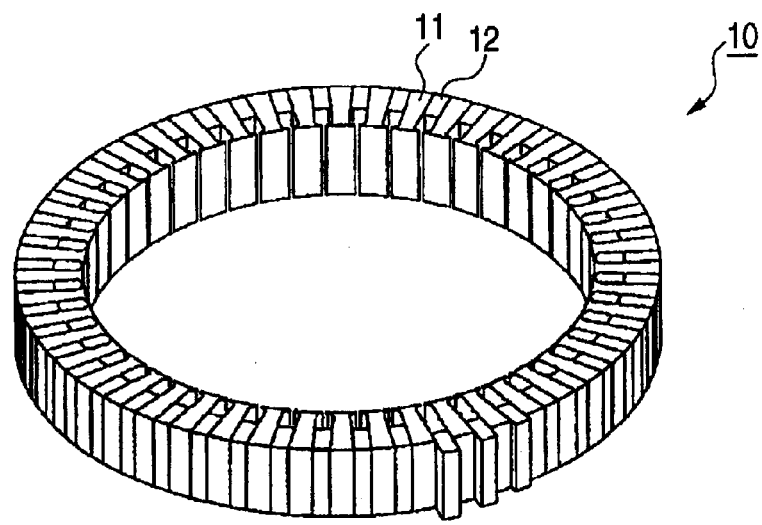
FIG. 1 is a perspective view of a stator according to an embodiment of the invention.
Figure 2:
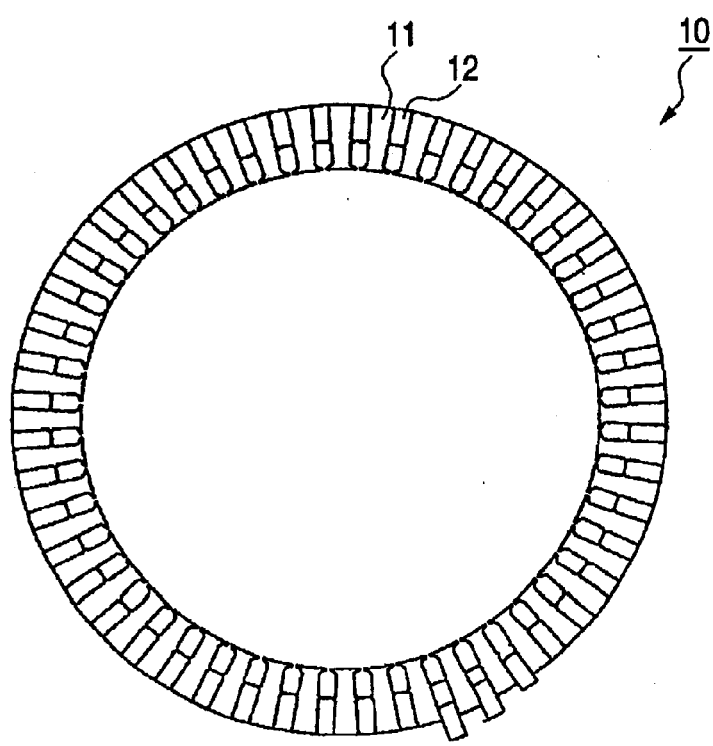
FIG. 2 is a plan view of the stator depicted in FIG. 1.

An embodiment of a stator according to the invention will be described below with reference to the accompanying drawings. As shown in FIGS. 1 and 2, the stator 10 in this embodiment has a plurality of teeth iron cores 11, ..., 11 shaped substantially cylindrically as a whole and disposed at regular circumferential intervals of a predetermined distance on the circumference of a predetermined circle, and core back iron cores 12, ..., 12 disposed on outer circumferential sides between adjacent ones of the teeth iron cores 11, ..., 11.

Figure 3:
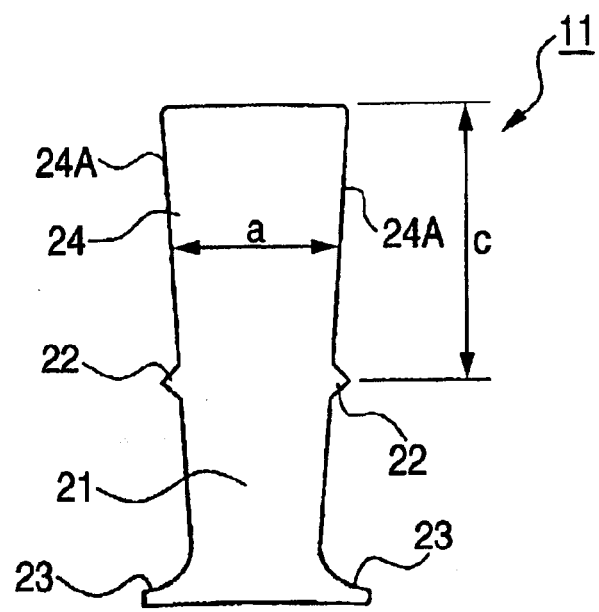
FIG. 3 is a plan view of a teeth iron core in the stator depicted in FIG. 1.

As shown in FIG. 3, each of the teeth iron cores 11 may be made of a laminate of directional electromagnetic steel plates, such as silicon steel plates. Radial directions of the stator 10 are set to be directions of easy magnetization.

Each of the teeth iron cores 11 has a predetermined thickness in a direction parallel to a center axis of the stator 10 and includes a winding portion 21 on its inner circumferential side, a pair of protrusive portions 22, 22, a pair of claw portions 23, 23, and a yoke portion 24 on its outer circumferential side.

The winding portion 21 is formed to have a predetermined width in the circumferential direction. The pair of protrusive portions 22, 22 protruded circumferentially outward are provided at outer circumferential side end portions of the winding portion 21. The pair of claw portions 23, 23 protruded circumferentially outward are provided at inner circumferential side end portions of the winding portion 21.

Here, two protrusive portions 22, 22 facing each other between adjacent teeth iron cores 11, 11 are formed so that the protrusive portions 22, 22 can abut on inner circumferential side end portions 12a of a core back iron core 12 inserted in between the teeth iron cores 11, 11 to thereby limit radially inward motion of the core back iron core 12.

The pair of claw portions 23, 23 in the winding portion 21 are provided so that a stator winding (not shown) wound on the winding portion 21 can be prevented from being dropped radially inward.

The yoke portion 24 is formed so that the circumferential width of the yoke portion 24 increases as the position goes from the inner circumferential side towards the outer circumferential side. In application, the yoke portion 24 has tapered yoke portion side surfaces 24A, 24A. The distance a between the yoke portion side surfaces 24A, 24A is set so that the distance a increases as the position goes from the inner circumferential side to the outer circumferential side.

Figure 5:
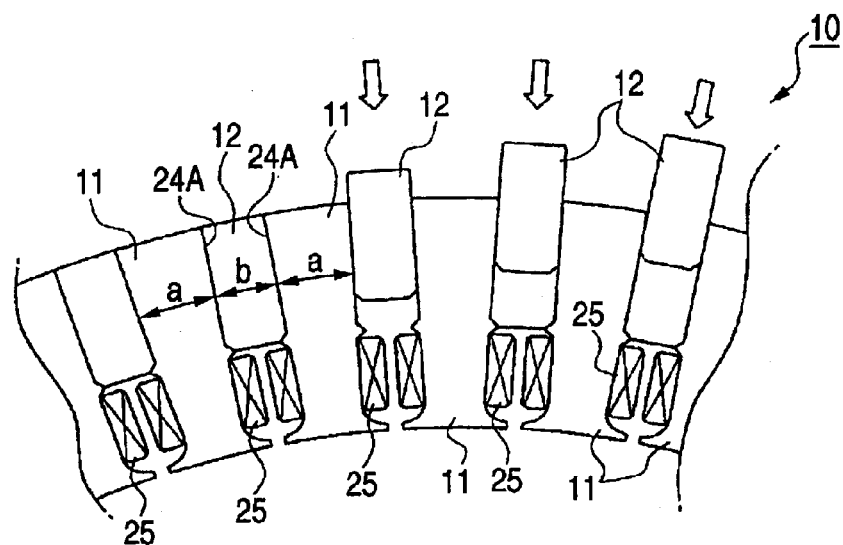
FIG. 5 is a plan view of important part of the stator depicted in FIG. 2.

As shown in FIG. 5, the distance b between two yoke portion side surfaces 24A, 24A facing each other between adjacent teeth iron cores 11, 11 disposed at a predetermined distance from each other on the circumference of a predetermined circle is set to have a constant value in a range of from the inner circumferential side to the outer circumferential side or to decrease slightly as the position goes from the inner circumferential side to the outer circumferential side.

Figure 4:
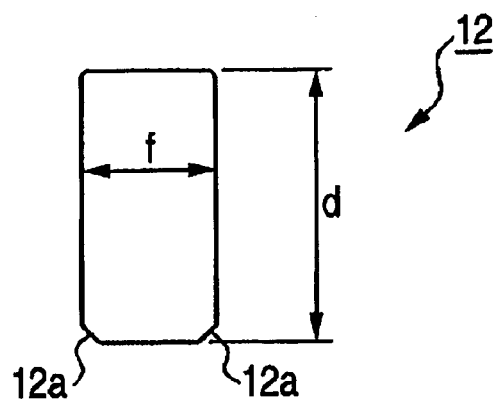
FIG. 4 is a plan view of a core back iron core in the stator depicted in FIG. 1.

As shown in FIG. 4, the core back iron core 12 may be constituted by a laminate of directional electromagnetic steel plates such as silicon steel plates and substantially shaped like a rectangular parallelepiped. The direction of easy magnetization in the core back iron core 12 is set to be the circumferential direction of the stator 10.

The thickness of the core back iron core 12 is formed to be equal to the thickness of the teeth iron core 11, and the radial length d of the core back iron core 12 is formed to be equal to the radial length c of the yoke portion 24 of the teeth iron core 11.

Further, the circumferential width f of the core back iron core 12 is formed to have a constant value in a range of from the inner circumferential side to the outer circumferential side. More specifically, the circumferential width f of the core back iron core 12 is formed to be equal to or slightly larger than the distance b between two yoke portion side surfaces 24A, 24A facing each other between adjacent teeth iron cores 11, 11.

Assuming now that the distance b between two yoke portion side surfaces 24A, 24A is set to decrease as the position goes from the inner circumferential side to the outer circumferential side, then the core back iron core 12 forced in between adjacent teeth iron cores 11, 11 is fixed so as to be clamped particularly between outer circumferential portions of the yoke portion side surfaces 24A, 24A.

Assuming now that the distance b between two yoke portion side surfaces 24A, 24A is set to be constant in a range of from the inner circumferential side to the outer circumferential side, then opposite side surfaces of the core back iron core 12 can be brought into surface contact with the yoke portion side surfaces 24A, 24A respectively so that the core back iron core 12 can be fixed so as to be clamped between the whole yoke portion side surfaces 24A, 24A from the opposite sides.

As shown in FIG. 5, a stator winding 25 is wound around the stator 10 so as to be put in the respective winding portions 21 of the teeth iron cores 11. As will be described later, the stator winding 25 is constituted by a plurality of wire bundles each of which is a bundle of a predetermined number of electric wires and which are connected in parallel with one another. Each of the wire bundles is set so that it makes one revolution around the stator 10. The wire bundles are also set so that the number of electric wires constituting a wire bundle located on the inner circumferential side between the teeth iron cores 11, 11 is smaller than the number of electric wires constituting a wire bundle located on the outer circumferential side.

When a suitable wire bundle which is a bundle of a predetermined number of electric wires makes one revolution around the stator 10, a wire bundle which is a bundle of a smaller number of electric wires is disposed in an inner circumferential side position relative to the position of the certain wire bundle.

Figure 7:
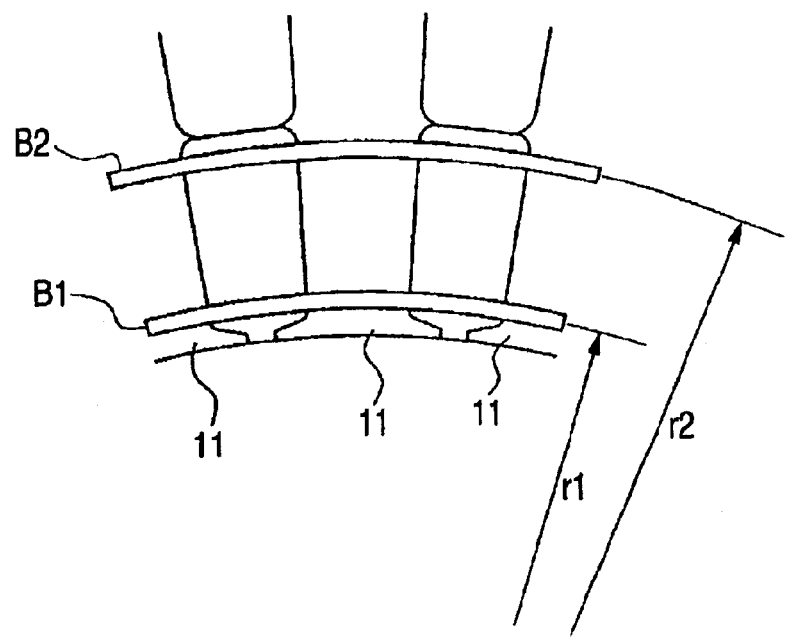
FIG. 7 is a sectional view of important parts of the stator depicted in FIG. 6.
Figure 8:
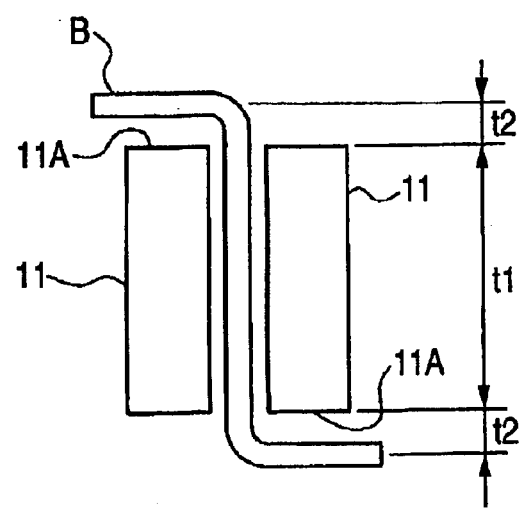
FIG. 8 is a view, from a radially outer circumferential side, of important parts of the stator depicted in FIG. 6.

Here, the number of electric wires constituting a wire bundle is determined, for example, in accordance with the circumferential length L and sectional area A of the wire bundle. Assuming now that wire bundles are wave-wound so that each wire bundle makes one revolution around the stator 10 so as to weave through the teeth iron cores 11, . . . , 11, then the circumferential length L of the wire bundle B per one phase and one revolution can be described on the basis of the radius r of the wire bundle which varies in accordance with the radial position between the teeth iron cores 11, 11 (for example, the radius r1 of the inner circumferential side wire bundle B1 and the radius r2 of the outer circumferential side wire bundle B2 as shown in FIG. 7), the number P of poles, the accumulated thickness t1 (for example, the thickness t1 of the teeth iron core 11 as shown in FIG. 8) and the coil end height t2 (for example, the distance t2 between the side surface 11A of the teeth iron core 11 and the stator winding 25 as shown in FIG. 8) as represented by the following expression (1).

[Expression 1]

$$L=(t1+2t2)P+2\Pi r \quad (1)$$

The ratio (L/A) of the circumferential length L calculated by the expression (1) to the sectional area A, that is, a value equivalent to the resistance value of each wire bundle is set to be in a predetermined allowable range in accordance with each wire bundle.

The stator 10 according to this embodiment is configured as described above. The method for producing the stator 10 will be described below with reference to the accompanying drawings.

Figure 6:
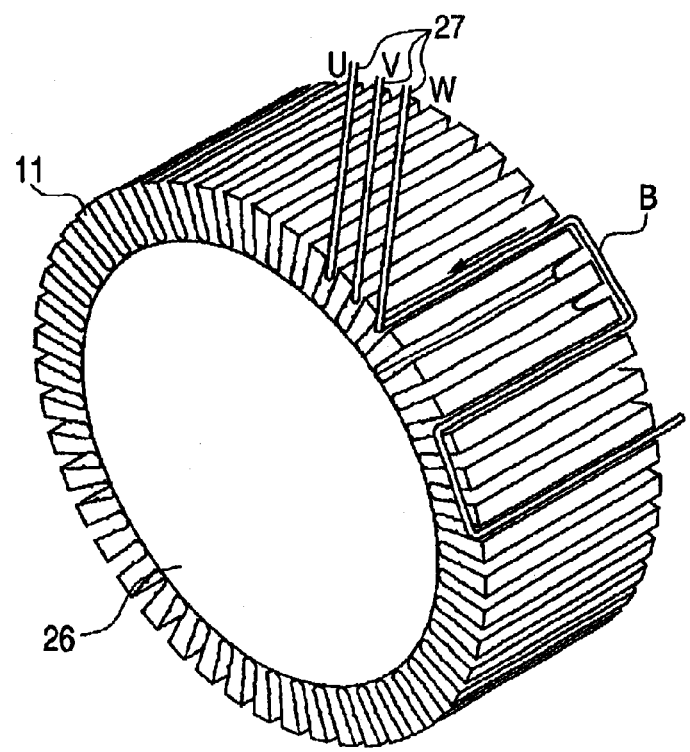
FIG. 6 is a view showing the step of winding a stator winding on teeth iron cores disposed at regular intervals of a predetermined distance.

First, for example as shown in FIG. 6, a plurality of teeth iron cores 11, . . . , 11 are disposed at regular intervals of a predetermined distance on an outer circumferential surface of a teeth fixing jig 26 shaped substantially cylindrically. Then, wire bundles B each of which is a bundle of a predetermined number of electric wires and which are fed from a plurality of nozzles 27, . . . , 27 respectively, are put in the winding portions 21 of the respective teeth iron cores 11. The plurality of nozzles 27, . . . , 27 are disposed in a suitable winding machine (not shown) which can revolve along the outer circumferential surface of the teeth iron cores 11, . . . , 11 fixed to a teeth fixing jig 26 and which can swing in a direction parallel to the axis of the stator 10.

On this occasion, each of the nozzles 27 is moved to weave through adjacent teeth iron cores 11, . . . , 11 at intervals of a predetermined number of teeth iron cores to thereby revolve a corresponding wire bundle B to be wound around the teeth iron cores 11 in total so that one phase of the stator winding 25 is put in between corresponding teeth iron cores 11, . . . , 11 whenever the wire bundle B makes one revolution.

Further, the number of electric wires fed from each nozzle 27 in each revolution is changed. For example, the number of electric wires is set so that the number of electric wires supplied to a wire bundle B disposed on the outer circumferential side in a radial direction between the teeth iron cores 11, . . . , 11 is larger than the number of electric wires supplied to a wire bundle B disposed on the inner circumferential side.

Incidentally, the number of the nozzles 27 may be the same as the number of phases in the stator winding 25 wound on the stator 10. For example, in the case of a three-phase motor, three nozzles 27, 27 and 27 may be provided so as to correspond to U, V and W phases. Each of the nozzles 27 is formed so that a predetermined number of electric wires are fed from the nozzle 27 while they are bundled. The three nozzles 27, 27 and 27 are revolved simultaneously to weave through the teeth iron cores 11, . . . , 11. Hence, when the nozzles 27, 27 and 27 make several revolutions, multi-phase (for example, U, V and W phase) winding is completed.

Then, as shown in FIG. 5, core back iron cores 12 are forced in between adjacent teeth iron cores 11 and 11 from the outer circumferential side, so that two protrusive portions 22 and 22 facing each other between the adjacent teeth iron cores 11 and 11 abut on inner circumferential side end portions 12a of each of the core back iron cores 12. Then, the teeth fixing jig 26 is removed.

Then, lead wires (not shown) for the plurality of wire bundles B1, . . . , Bn (in which n is an arbitrary natural number) constituted by different numbers of electric wires respectively are connected in parallel with one another in accordance with each phase. Thus, the stator is complete.

Figure 9:
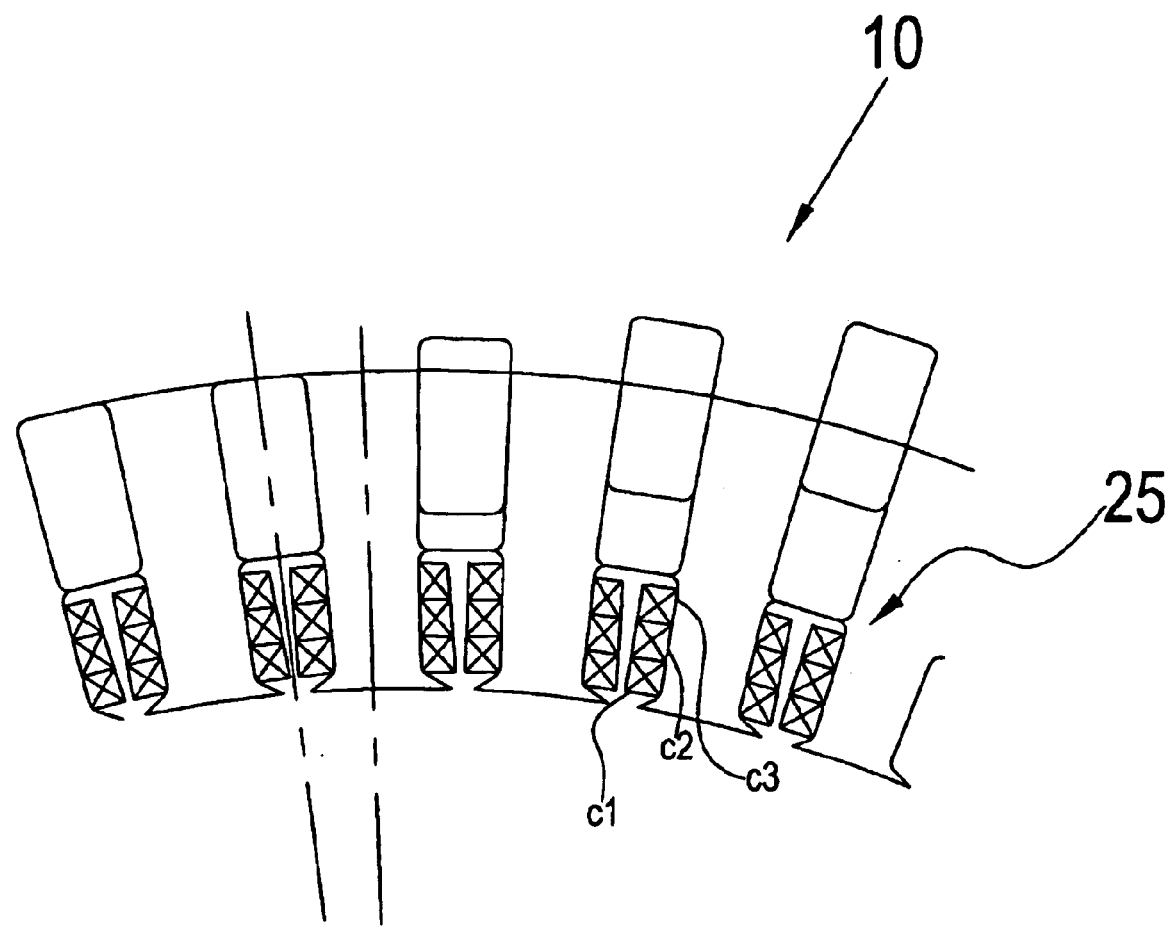
FIG. 9 is a plan view of wire bundles of the invention having differing numbers of electric wires.

An example of the stator 10 produced by the stator producing method according to the embodiment will be described below. In the following example, as shown in FIG. 9, the stator winding 25 is constituted by three wire bundles C1, C2 and C3. The wire bundle C2 is disposed on an outer circumferential side of the wire bundle C1 revolving on the innermost circumferential side. The wire bundle C3 is further disposed on an outer circumferential side of the wire bundle C2. For example, the sectional area of each electric wire in the plurality of electric wires constituting each wire bundle C1, C2 or C3 is set at 0.0625 mm.

The case where the stator winding 25 is formed so that the wire bundle C1 is constituted by 18 electric wires, the wire bundle C2 is constituted by 19 electric wires and the wire bundle C3 is constituted by 20 electric wires is provided as an example according to the invention. The case where the stator winding 25 is formed so that each of the wire bundles C1, C2 and C3 is constituted by 20 electric wires is provided as a comparative example.

Table 1 shows the sectional area A (total sectional area of electric wires) of each wire bundle C1, C2 and C3, the circumferential length L thereof, the ratio (L/A) of the circumferential length L to the sectional area A, the resistance value difference caused by the sectional area difference of the wire bundle C1 or C2 from the wire bundle C3, the ratio of the circumferential length difference of the wire bundle C1 or C2 from the wire bundle C3 and the resistance value difference (ratio (L/A) difference) of the wire bundle C1 or C2 from the wire bundle C3 in this example.

Like Table 1, Table 2 shows the sectional area A of each wire bundle C1, C2 and C3, the resistance value difference caused by the sectional area difference, the circumferential length L, the circumferential length difference, the ratio (L/A) of the circumferential length L to the sectional area A and the resistance value difference (ratio (L/A) difference) of the wire bundle C1 or C2 from the wire bundle C3 in the comparative example.

TABLE 1

Example

| | Wire bundle | | |
|---|---|---|---|
| | C1 | C2 | C3 |
| Number of electric wires | | | |
| 1 | 0.0625 | 0.0625 | 0.0625 |
| 2 | 0.0625 | 0.0625 | 0.0625 |
| 3 | 0.0625 | 0.0625 | 0.0625 |
| 4 | 0.0625 | 0.0625 | 0.0625 |
| 5 | 0.0625 | 0.0625 | 0.0625 |
| 6 | 0.0625 | 0.0625 | 0.0625 |
| 7 | 0.0625 | 0.0625 | 0.0625 |
| 8 | 0.0625 | 0.0625 | 0.0625 |
| 9 | 0.0625 | 0.0625 | 0.0625 |
| 10 | 0.0625 | 0.0625 | 0.0625 |
| 11 | 0.0625 | 0.0625 | 0.0625 |
| 12 | 0.0625 | 0.0625 | 0.0625 |
| 13 | 0.0625 | 0.0625 | 0.0625 |
| 14 | 0.0625 | 0.0625 | 0.0625 |
| 15 | 0.0625 | 0.0625 | 0.0625 |
| 16 | 0.0625 | 0.0625 | 0.0625 |
| 17 | 0.0625 | 0.0625 | 0.0625 |
| 18 | 0.0625 | 0.0625 | 0.0625 |
| 19 | — | 0.0625 | 0.0625 |
| 20 | — | — | 0.0625 |
| Sectional area A [mm$^2$] | 1.125 | 1.188 | 1.250 |
| Resistance difference caused by sectional area difference [%] | 10 | 5 | 0 |
| Circumferential length L [mm] | 1268.3 | 1331.2 | 1394.0 |
| Circumferential length difference [%] | −9.01 | −4.51 | 0.00 |
| L/A | 1127.4 | 1121.0 | 1115.2 |
| Resistance difference (L/A difference) [%] | 1.09 | 0.52 | 0.00 |

TABLE 2

Comparative Example

| | Wire bundle | | |
|---|---|---|---|
| | C1 | C2 | C3 |
| Number of electric wires | | | |
| 1 | 0.0625 | 0.0625 | 0.0625 |
| 2 | 0.0625 | 0.0625 | 0.0625 |
| 3 | 0.0625 | 0.0625 | 0.0625 |
| 4 | 0.0625 | 0.0625 | 0.0625 |
| 5 | 0.0625 | 0.0625 | 0.0625 |
| 6 | 0.0625 | 0.0625 | 0.0625 |
| 7 | 0.0625 | 0.0625 | 0.0625 |
| 8 | 0.0625 | 0.0625 | 0.0625 |
| 9 | 0.0625 | 0.0625 | 0.0625 |
| 10 | 0.0625 | 0.0625 | 0.0625 |
| 11 | 0.0625 | 0.0625 | 0.0625 |
| 12 | 0.0625 | 0.0625 | 0.0625 |
| 13 | 0.0625 | 0.0625 | 0.0625 |
| 14 | 0.0625 | 0.0625 | 0.0625 |

TABLE 2-continued

Comparative Example

| | Wire bundle | | |
|---|---|---|---|
| | C1 | C2 | C3 |
| 15 | 0.0625 | 0.0625 | 0.0625 |
| 16 | 0.0625 | 0.0625 | 0.0625 |
| 17 | 0.0625 | 0.0625 | 0.0625 |
| 18 | 0.0625 | 0.0625 | 0.0625 |
| 19 | 0.0625 | 0.0625 | 0.0625 |
| 20 | 0.0625 | 0.0625 | 0.0625 |
| Sectional area A [$mm^2$] | 1.250 | 1.250 | 1.250 |
| Resistance difference caused by sectional area difference [%] | 0 | 0 | 0 |
| Circumferential length L [mm] | 1268.3 | 1331.2 | 1394.0 |
| Circumferential length difference [%] | −9.01 | −4.51 | 0.00 |
| L/A | 1014.7 | 1064.9 | 1115.2 |
| Resistance difference (L/A difference) [%] | −9.01 | −4.51 | 0.00 |

Assuming now that the ratio of the resistance value change to the temperature change due to heat generated in the stator winding 25 supplied with electricity is 0.4%/° C. and the allowable range of the temperature difference generated in the stator winding 25 locally is 10° C., then the resistance value difference in the stator winding 25 needs to be set at 4%.

In the Comparative Example shown in Table 2, because the number of electric wires constituting the wire bundles C1, C2 and C3 respectively are equal to one another, the sectional areas A of the wire bundles C1, C2 and C3 become equal to one another. Hence, the resistance value differences are generated in accordance with the circumferential lengths of the wire bundles C1, C2 and C3, respectively. Therefore, when the outermost circumferential side wire bundle C3 is regarded as a reference, the resistance value of the wire bundle C2 is smaller, by 4.51% than the resistance value of the wire bundle C3 and the resistance value of the wire bundle C1 on the innermost circumference side is smaller by 9.01% than the resistance value of the wire bundle C3. That is, in comparative Example, the resistance value difference exceeds the allowable range of 4%.

On the other hand, in the Example shown in Table 1, the resistance value differences are generated in accordance with the sectional areas A of the wire bundles C1, C2 and C3 because the number of electric wires constituting a wire bundle on the inner circumferential side is set to be smaller. That is, when the outermost circumferential side wire bundle C3 is regarded as a reference, the resistance value caused by the sectional area A of the wire bundle C2 is larger by 5% than the resistance value caused by the sectional area A of the wire bundle C3 and the resistance value caused by the sectional area A of the innermost circumferential side wire bundle C1 is larger by 10% than the resistance value caused by the sectional area A of the wire bundle C3.

Moreover, resistance value differences are generated in accordance with the circumferential lengths of the wire bundles C1, C2 and C3 respectively in the same manner as in the Comparative Example. Hence, the resistance value caused by the circumferential length L of the inner circumferential side wire bundle becomes smaller with reference to the outermost circumferential side wire bundle C3.

Accordingly, the resistance value caused by the sectional area A can be offset by the resistance value caused by the circumferential length L. Consequently, when the outermost circumferential side wire bundle C3 is regarded as a reference, the resistance value of the wire bundle C2 is larger by 0.52% than the resistance value of the wire bundle C3 and the resistance value of the innermost circumferential side wire bundle C1 is larger by 1.09% than the resistance value of the wire bundle C3. Accordingly, in the Example, the resistance value difference is smaller than the allowable range of 4%.

When the numbers of electric wires constituting the wire bundles C1, C2 and C3 respectively are changed in accordance with the radial positions between the teeth iron cores 11, . . . , 11, the resistance value difference among the wire bundles C1, C2 and C3 can be set to be not larger than about 1% and, accordingly, the local temperature difference generated in the stator winding 25 can be set to be in a desired allowable range.

As described above, in the stator 10 according to this embodiment, the resistance value caused by the sectional area of each of a plurality of wire bundles constituting the stator winding 25 can be offset by the resistance value caused by the circumferential length of the wire bundle, so that the resistance values of the plurality of wire bundles can be set to be equal to one another regardless of the radial position between the teeth iron cores 11, . . . , 11. Hence, both reduction in space factor and an increase in coil end height can be prevented when the resistance values of the plurality of wire bundles are set to be equal to one another.

In the stator producing method according to this embodiment, both reduction in space factor and an increase in coil end height can be prevented when the resistance values of the plurality of wire bundles are set to be equal to one another. Moreover, when the number of electric wires constituting the inner circumferential side wire bundle is set to be smaller than the number of electric wires constituting the outer circumferential side wire bundle, the cost required for producing the stator 10 can be prevented from increasing.

Although the embodiment has shown the case where the number of electric wires constituting the inner circumferential side wire bundle is set to be smaller than the number of electric wires constituting the outer circumferential side wire bundle, the invention may be applied also to the case where the number of electric wires constituting the outer circumferential side wire bundle is set to be larger than the number of electric wires constituting the inner circumferential side wire bundle.

ADVANTAGES OF THE INVENTION

As described above, in the stator according to the invention, both reduction in space factor, and an increase in coil end height can be prevented regardless of the radial position between adjacent teeth iron cores when the resistance values of the plurality of wire bundles are set to be equal to one another.

Further, in the stator producing method according to the invention, an increase in production cost can be prevented as well as both a reduction in space factor and an increase in coil end height can be prevented regardless of the radial position between adjacent teeth iron cores when the resistance values of the plurality of wire bundles are set to be equal to one another.

What is claimed is:

1. A stator comprising:
    a plurality of teeth iron cores disposed at regular intervals of a predetermined distance in a predetermined circumferential direction;
    core back on cores, each provided on an outer circumferential side between adjacent ones of said teeth iron cores; and a stator winding comprising a plurality of wire bundles arranged between said teeth iron cores so as to make one revolution along said circumferential direction and connected in parallel with one another, wherein:

each of said wire bundles is a bundle of electric wires; and said wire bundles are formed so that a number of electric wires forming a wire bundle on an inner circumferential side between said teeth iron cores is smaller than a number of electric wires forming a wire bundle on an outer circumferential side between said teeth iron cores.

2. A method of producing a stator, comprising:

arranging bundles of electric wires between a plurality of teeth iron cores disposed at regular intervals of a predetermined distance in a predetermined circumferential direction so that said wire bundles make one revolution along said circumferential direction; and connecting said wire bundles revolving along said circumferential direction in parallel with one other;

wherein said wire bundles are formed so that a number of electric wires forming a wire bundle on an inner circumferential side between said teeth iron cores is smaller than a number of electric wires forming a wire bundle on an outer circumferential side between said teeth iron cores.

3. The stator according to claim 1, wherein a resistance value difference among the wire bundles is set to be not larger than about 1%.

4. The method of producing a stator according to claim 2, wherein the wire bundles, each of which is a bundle of a predetermined number of electric wires and which are fed from a plurality of nozzles respectively, are provided in each of the nozzles.

5. The method of producing a stator according to claim 2, wherein each of the nozzles is moved to weave through the adjacent teeth iron cores at intervals of a predetermined number of the teeth iron cores to thereby revolve a corresponding wire bundle to be wound around the teeth iron cores in total so that one phase of the stator winding is put in between the corresponding teeth iron cores whenever the wire bundle makes one revolution.

6. The method of producing a stator according to claim 2, wherein three nozzles are provided in a case of a three-phase motor, wherein each of the nozzles is formed so that a predetermined number of electric wires are fed from the nozzle while they are bundled, and wherein the three nozzles are revolved simultaneously to weave through the teeth iron cores.

* * * * *